United States Patent [19]

Schmidt et al.

[11] 4,328,174

[45] May 4, 1982

[54] AROMATIC POLYESTER PHOSPHONATES

[75] Inventors: Manfred Schmidt, New Martinsville, W. Va.; Dieter Freitag; Ludwig Bottenbruch, both of Krefeld, Fed. Rep. of Germany; Klaus Reinking, Wermelskirchen, Fed. Rep. of Germany; Harry Röhr, Frechen, Fed. Rep. of Germany; Harald Medem, Krefeld, Fed. Rep. of Germany

[73] Assignee: Bayer Aktiengesellschaft, Leverkusen, Fed. Rep. of Germany

[21] Appl. No.: 160,957

[22] Filed: Jun. 19, 1980

[30] Foreign Application Priority Data

Jun. 22, 1979 [DE] Fed. Rep. of Germany ....... 2925206

[51] Int. Cl.$^3$ .............................................. C07F 9/40
[52] U.S. Cl. ............................................................ 260/930
[58] Field of Search ........................................ 260/930

[56] References Cited

U.S. PATENT DOCUMENTS 4,117,042  9/1978  Couchoud ........................... 260/930

Primary Examiner—Anton H. Sutto
Attorney, Agent, or Firm—Connolly and Hutz

[57] ABSTRACT

Polyester phosphonates based on aromatic dicarboxylic acids and aromatic dihydroxy compounds exhibit a low flammability and surprisingly improved mechanical characteristics, particularly an excellent dimensional heat stability.

5 Claims, No Drawings

AROMATIC POLYESTER PHOSPHONATES

This invention relates to aromatic polyester phosphates which have an average molecular weight $\overline{M}_n$ of at least 11,000 to a process for their preparation by reacting aromatic dicarboxylic acid diaryl esters, phosphonic acid diaryl esters and aromatic dihydroxy compounds, and to their use for the preparation of thermoplastic moulded bodies.

Polyphosphonates are known (German Auslegeschrift No. 1,569,340, German Offenlegungsschriften Nos. 2,458,967 and 2,461,658; U.S. Pat. Nos. 2,682,522; 2,716,101; 2,891,915; 3,719,727; 3,919,363; 3,946,093 and 4,046,724). They are outstanding as a result of their high flame resistance and excellent tensile strength. However, they have only relatively slight dimensional stability under heat, which hinders their use of the preparation of high-temperature-resistant moulded bodies.

Surprisingly, it has been found that new co-condensates, which contain phosphonate groups as well as ester units of aromatic dicarboxylic acids and aromatic dihydroxy compounds, exhibit a scarcely decreased non-flammability compared to the known polyphosphonates, but thereby improved mechanical characteristics and particularly an increased dimensional stability under heat to an unexpectedly high degree. Conversely, the low flowability, which is known as a disadvantage of aromatic polyesters, is increased by the phosphate groups to such an extent that the co-condensates according to the invention can be processed more easily than aromatic polyesters of high molecular weight. It is obvious that the described effects vary with an increasing proportion of the ester units.

The present invention thus provides polyester phosphates which have an average molecular weight $\overline{M}_n$ of at least 11,000, preferably from 11,000 to 200,000, more preferably from 12,000 to 80,000, characterised in that they contain (a) from 5 to 95 mol %, preferably from 10 to 60 mol %, of recurring units of the structure:

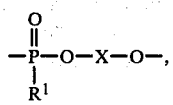

(B) from 95 to 5 mol %, preferably from 90 to 40 mol %, of recurring units of the structure:

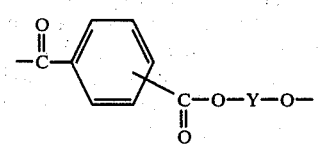

whereby the mole percentages of (A)+(B) add up to a total of 100, and (C) end groups linked to phosphorus:

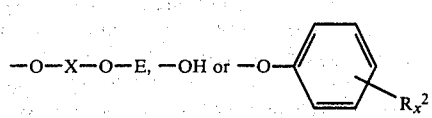

and end groups linked to oxygen:

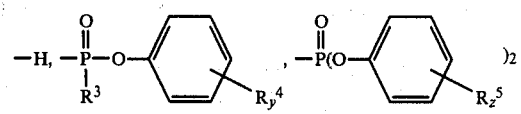

or E, in which X and Y each independently represent

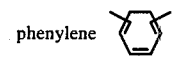
phenylene

biphenylylene

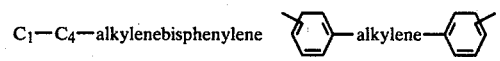
$C_1$–$C_4$–alkylenebisphenylene

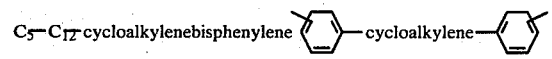
$C_5$–$C_{12}$–cycloalkylenebisphenylene

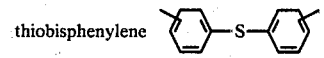
thiobisphenylene

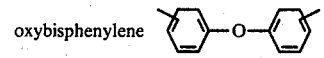
oxybisphenylene

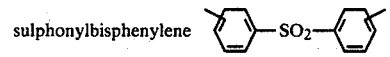
sulphonylbisphenylene

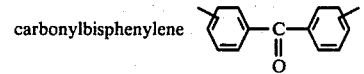
carbonylbisphenylene

naphthylene in which each phenyl nucleus is unsubstituted or substituted by from 1 to 4 $C_1$-$C_4$-alkyl groups and/or halogen atoms (F, Cl or Br) and the naphthylene nucleus is unsubstituted or substituted by from 1 to 6 of the above-mentioned groups or atoms, $R^1$ and $R^3$ each independently represent alkyl radicals having from 1 to 12 carbon atoms, alkenyl radicals having from 2 to 12 carbon atoms, or cycloalkyl, cycloalkenyl, aryl, aralkyl or aralkenyl radicals having from 6 to 30 carbon atoms, in which each aryl group is unsubstituted or substituted by from 1 to 5 $C_1$-$C_4$-alkyl radicals and/or halogen atoms (F, Cl, Br), E represents

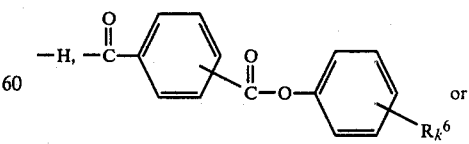 or

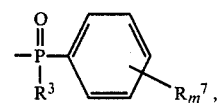, $R^2$, $R^4$, $R^5$, $R^6$ and $R^7$ each independently represent $C_1$-$C_4$-alkyl groups and/or halogen atoms (such as F, Cl, Br), and k, m, x, y and z each independently represent zero or an integer from 1 to 5.

The above definitions are preferably the following:
$R^1$ and $R^3$ represent methyl or phenyl, particularly methyl, X and Y represent phenylene, bisphenylene, $C_1$-$C_4$-alkylenebisphenyls, in which each phenyl nucleus can be substituted by from 1 to 4 methyl groups, cyclohexylene-bisphenylene, oxybisphenylene, thiobisphenylene, sulphonylbisphenylene, particularly $C_1$-$C_4$-alkylenebisphenylene, in which each phenyl nucleus can be substituted by 1 or 2 methyl groups, $R^2,R^4,R^5,R^6,R^7$ represent $C_1$-$C_4$-alkyl groups, and k,m,x,y,z, represent zero.

The average molecular weights are measured by membrane-osmometry using membranes which are impermeable up to $\overline{M}_n=3000$ (it has been established by gel chromatography that the co-concensates did not contain any portions with $\overline{M}_n<3000$). These molecular weights approximately correspond to relative viscosities of from 1.20 to more than 2.0, preferably from 1.24 to 1.40 (measured on a 0.5% by weight solution in methylene chloride at 25° C.).

Preferred co-condensates of the invention are the halogen-free polyester phosphonates which, owing to their composition, cannot produce any pyrolysis gases containing halogen under the effect of high temperatures.

The invention also provides a process for the preparation of the polyester phosphonates defined above by transesterification, characterised in that (I) from 5 to 95 mols, preferably from 40 to 90 mols, of at least one iso- and/or terephthalic acid diarylester, and (II) from 95 to 5 mols, preferably from 60 to 10 mols, of at least one phosphonic acid diarylester, the total of (I)+(II) amounting to 100 mols, are reacted with (III) from 91 to 99 mols, preferably from 93 to 97 mols, of at least one aromatic dihydroxy compound in the presence of from $10^{-7}$ to $2.10^{-4}$ mols, preferably from $7.10^{-6}$ to $2.10^{-5}$ mols, based on 1 mol of (III), of basic transesterification catalysts in the melt at a temperature of from 80° to 340° C., preferably from 100° to 320° C. and under reduced presure, the volatile mono-hydroxy aryls being split off, until the required condensation level has been reached.

Preferred iso- and/or terephthalic acid diarylesters (I) correspond to the formula:

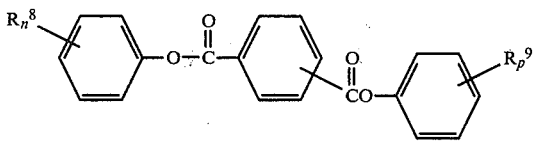

wherein
$R^8$ and $R^9$ represent $C_1$-$C_4$-alkyl groups and/or halogen atoms (such as F, Cl, Br), and
n and p represent an integer from 1 to 5, but preferably zero.

Particularly preferred diarylesters (I) are iso- and terephthalic acid diphenyl esters. Preferred molar mixing ratios of these esters range from 10:1 to 1:10.

Preferred phosphonic acid diarylesters (II) correspond to the formula:

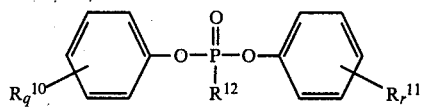

wherein
$R^{10}$ and $R^{11}$ are as defined above for $R^2$ or $R^4$ to $R^7$
q and r are as defined above for k,m,x,y, or z,
$R^{12}$ is as defined above for $R^1$ or $R^3$.

Phosphonic acid diarylesters (II) which are particularly preferred are halogen-free alkyl phosphonic acid diphenylesters and aryl phosphonic acid diphenyl esters, particularly methyl phosphonic acid diphenyl esters and phenyl phosphonic acid diphenyl esters.

Preferred aromatic dihydroxy compounds (III) have the following structures:

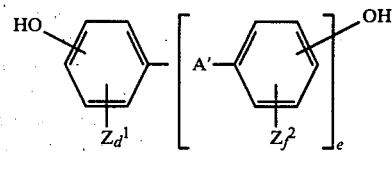

or

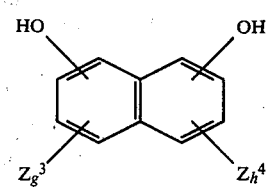

wherein
A' represents a single bond, an alkylene group having from 1 to 4 carbon atoms, a cycloalkylene group having 5 or 6 carbon atoms, a sulphonyl group, a carbonyl group, an oxygen atom or a sulphur atom,
e represents zero or 1,
$Z^1,Z^2,Z^3,Z^4$ represent F, Cl, Br, or $C_1$-$C_4$-alkyl,
d,f represent zero or integers from 1 to 4,
g,h represent zero or integers from 1 to 3.

Aromatic dihydroxy compounds (III) which are particularly preferred are the following: hydroquinone, 4,4'-dihydroxydiphenylether, bis-(4-hydroxyphenyl)-alkanes and -cycloalkanes, e.g. 2,2-bis-(4-hydroxyphenyl)-methane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, but particularly 4,4'-dihydroxydiphenyl, 4,4'-sulphonyldiphenyl, 1,1-bis-(4-hydroxyphenyl)-cyclohexane, 4,4'-dihydroxydiphenylsulphide and 2,2-bis-(4-hydroxyphenyl)-propane.

The polyester phosphonates according to the invention can be branched by building in smaller quantities, preferably from 0.05 to 3 mol %, based on the aromatic dihydroxy compounds (III), of more than bivalent compounds comprising more than two phenolic hydroxyl groups, or from 0.05 to 3 mol %, based on the iso or terephthalic diaryl esters (I), of triaryl phosphates or arylesters of more than dibasic carboxylic acids.

Preferred branched compounds comprising more than two hydroxyl groups are the following: phloroglucine, 4,6-dimethyl-2,4,6-tri-(4-hydroxyphenyl)hept-2-ene-4,6-dimethyl-2,4,6-tri-(4-hydroxyphenyl)-heptane, 1,3,5-tri(4-hydroxyphenyl)-benzene, 1,1,1-tri-(4-hydroxyphenyl)-ethane, tri-(4-hydroxyphenyl)-phenylmethane, 2,2-bis-[4,4,-bis-(4-hydroxyphenyl)-cyclohexyl]-propane, 2,4-bis-(4-hydroxyphenyl)-isopropylphenol, 2,6-bis-(2'-hydroxy-5'-methylbenzyl)-4-methylphenol, 2-(4-hydroxyphenyl)-2-(2,4-dihydroxyphenyl)-propane, tetra-(4-hydroxyphenyl)-methane, tetra-[4-hydroxyphenylisopropyl-phenoxy]-methane and 1,4-bis-(4,4''-dihydroxytriphenyl-methyl)-benzene or mixtures thereof.

Triaryl phosphates which are preferred as branching agents correspond to the formula:

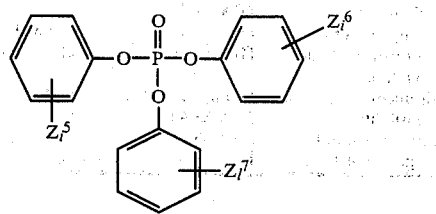

wherein
$Z^5, Z^6, Z^7$ are as defined above for $Z^1$ to $Z^4$, and
i,j,l, are as defined above for d,f,g or h.
Triphenyl phosphate is particularly preferred.

The triarylesters of tricarboxylic acids such as trimesic acid and the tetra-arylesters of tetracarboxylic acids such as pyromellitic acid are to be mentioned as aryl esters of more than dibasic carboxylic acids which are preferred as branching agents.

Basic transesterification catalysts which are preferred are the following: alcoholates of the alkali metals and alkaline earth metals such as sodium methylate or calcium ethylate, sodium, potassium or lithium phenolates of monofunctional phenols, sodium, potassium or lithium salts of the aromatic dihydroxy compounds (III) of the above formulae, hydrides of the alkali metals or alkaline earth metals such as lithium hydride, sodium borohydride or calcium hydride, oxides of the alkali metals and alkaline earth metals such as lithium oxide, sodium oxide or barium oxide, amides of the alkali metals and alkaline earth metals such as sodium amide or calcium amide and basic-reacting salts of the alkali metals or alkaline earth metals with organic or inorganic acids such as sodium acetate, sodium benzoate or sodium carbonate.

Imidazole is also suitable. Mixtures of the above catalysts can also be used. However, monofunctional alkali metal phenolates, such as sodium phenolate, are preferably used.

All the starting materials which are used for transesterification should have purity levels of $>99.1\%$, preferably $>99.7\%$.

In order to carry out the process of the invention, the iso- and/or terephthalic acid diarylesters (I) and the phosphonic acid diaryl esters (II), and optionally branching agents, are reacted with the aromatic dihydroxy compounds (III) in the presence of the transesterification catalysts in an oxygen-free atmosphere, e.g. in the presence of an inert gas, such as nitrogen.

The basic transesterification catalyst can be neutralised towards the end of the reaction in the co-condensate melt by adding a base-binding substance such as, for example, dimethyl sulphate, diethyl sulphate, benzoyl chloride or phenyl chloroformic acid ester. The volatile neutralisation products which are formed can be removed from the melt by distilling off under vacuum. After the catalyst has been neutralised, transesterification can be continued to a restricted extent in order to obtain a required higher molecular weight.

When the reaction has finished, the resulting melt of the polyester phosphonate is converted into granules or directly into moulded structures such as films, fibres or bristles in the usual manner. The polyester phosphonates thus obtained can be processed in the melt flow into moulded bodies of extreme nonflammability and high dimensional stability under heat, by means of commercially used processing units such as extruders and injection moulding machines. Other valuable characteristics of the polyester phosphonates of the invention are their superior mechanical characteristics, such as for example their high tenacity and tensile strength.

The polyester phosphonates according to the invention are soluble in methylene chloride, 1,1,2,2,-tetrachloroethane, trichloroethylene, chloroform, chlorobenzene, 1,2-dichlorobenzene, dioxane and hexamethylene phosphoric acid triamide, excluding the polyester phosphonates with X or Y=thiobisphenylene (in structure A or B as defined above).

Antistatic agents, pigments, mould-release agents, thermal stabilisers, UV-stabilisers, fillers such as for example talcum, mineral wool, mica, calcium carbonate, dolomite, and reinforcing fillers such as e.g. glass fibres, glass balls, and asbestos can be added to the polyester phosphonates.

The thermophastic, aromatic preferably halogen-free polyester phosphonates according to the invention can be widely used where thermoplastic chemical materials of the highest nonflammability are required, and in addition where the evolution of toxic pyrolysis gases under the effect of very high temperatures is to be avoided. Areas of use of this type are found, for example, in motor vehicle and aeroplane construction, in the space sector or in the field of safety technology. The invention thus also relates to the use of the polyester phosphonates according to the invention for the preparation of thermoplastic moulded bodies.

The thermoplastic, aromatic polyester phosphonates obtained from the process of the invention described above were extruded at a temperature of from 280° C. to 330° C. and formed into test bodies.

Testing the behaviour for bearing stress was effected by measuring the beating tenacity according to Charpy $a_n$ as defined in DIN 53,453 or ASTM D 256 and also by measuring the notched bar test toughness according to Charpy $a_k$ as defined in DIN 53,453 or ASTM D 256. Measuring the hardness was effected by measuring the indentation hardness HK according to DIN 53,456. Examining the mechanical-elastic characteristics was effected by tension-deformation experiments such as by measuring the flexion-E-modulus according to DIN 53,457, by measuring the flexing strength $\sigma_{B'}$, by measuring the tension-E-modulus according to DIN 53,457, by measuring the tensile strength $\sigma_{R'}$, the elongation at tear $\epsilon_{R'}$ the elongation resistance $\sigma_S$ and the extensibility $\epsilon_S$ according to DIN 53,455 (1968) or ASTM D 638.

Examining the dimensional stability under heat was effected by measuring the Vicat-softening point VSP according to DIN 53,460 or ISO/R 306.

Examining the behaviour in fire was effected by measuring the $O_2$-Index according to ASTM D 2863-70 as well as by measuring the afterburn time according to the UL-Test (Subj. 94).

In this case, in the injection moulding process, test rods were moulded at from 300° to 310° C., having the following dimensions:
127×12.7×1.6 mm (1/16") and
127×12.7×3.2 mm (1/8")

The test rods were subjected to the test process according to Underwriters Laboratories, Inc. Bulletin 94, combustion test for classifying materials.

According to this testing process, the materials tested thus were either classified by UL-94 V-O, UL-94 V-I and UL-94 V-II, that is based on the results obtained from the 10 experiments. The criteria for each of these V-classifications according to UL-94 are in short as follows:

UL-94 V-O: The average flaming and/or glowing after removing the pilot flame should not exceed 5 seconds and none of the samples should let particles drop off which ignite absorbing cotton.

UL-94 V-I: The average flaming and/or glowing after removing the pilot flame should not exceed 25 seconds and none of the samples should let particles drop which ignite absorbing cotton.

UL-94 V-II: The average flaming and/or glowing after removing the pilot flame should not exceed 25 seconds and the samples drop flaming particles which ignite absorbing cotton.

Furthermore, a test rod which burned for more than 25 seconds after removing the pilot flame, was not classified according to UL-94, but was classified according to the standard conditions of the present invention as "burns." The regulation UL-94 also requires that all the test rods of an experiment have to meet the requirements of the respective V-assessment, otherwise the ten test rods are assessed as for the worst individual rod. When, for example, one rod is assessed as UL-94 V-II and the other nine test rods are assessed as UL-94 V-O, then all the ten rods are assessed as UL-94 V-II.

The percentages in the following Examples are by weight, except in the case of the measured values of the mechanical characteristics of the polyester phosphonates.

EXAMPLE 1

5140 g (16.16 mols) of iso- and terephalic acid diphenylester mixture (1:1), 1333 g (5.375 mols) of methyl phosphonic acid diphenylester, 4869 g (21.36 mols) of bisphenol A, 2.26 g ($0.715 \cdot 10^{-2}$ mol) of triphenylphosphate and 0.32 g ($2.76 \cdot 10^{-3}$ mols) of sodium phenolate are mixed intensively under nitrogen at 250° C. Phenol is then distilled off over a column heated to 100° C. for 5 hours at a temperature rising from 250° C. to 280° C. and at a pressure gradually falling from 250 mbar to 10 mbar. The reaction is then continued for 1½ hours at from 290° C. to 310° C. and at a pressure of 0.3 mbar, whereby the speed of the stirrer falls to a constant value. After the stirring autoclave has been ventilated with nitrogen, the polyester phosphonate is left to settle for 1 hour at 300° C. when the stirrer has been deactivated and the co-condensate is then isolated by spinning off under pressure (approximately 10 bar) and granulating the melt strand. 5 kg of an amorphous polyester phosphonate are obtained, containing iso-/terephthalate units and phosphonate-units in a molar ratio of 3:1.

Analytical data:

Weight Average Molecular Weight: $\overline{M}_n = 24,600$,
Relative Solution Viscosity $\eta$ rel = 1.314, (measured at 25° C. in 0.5% solution in methylene chloride)
Content of Phosphorus 2.3%

Burning resistance values and mechanical testing values of the aromatic polyester phosphonates according to Example 1:

| Test | Testing norm ASTM-D | Testing value 54% VO (1/16") afterburning time: |
|---|---|---|
| $O_2$ - Index | 2863-70 | O-1 sec |
| Vicat B | DIN 53 460 | 160° C. |
| Beating strength $a_n$ | DIN 53 453 | unbroken |
| Notched bar test toughness $a_k$ | DIN 53 453 | 3-4 |
| Indentation hardness HK | DIN 53 456 | 125 MPa |
| Flexion-E-modulus | DIN 53 457 | 2100 MPa |
| Flexing strength$_B$ | DIN 53 457 | 109 MPa |
| Tension-E-modulus | DIN 53 457 | 2500 MPa |
| Elongation resistance$_S$ | Din 53 455 (1968) | 64 MPa |
| Extensibility$_S$ | DIN 53 455 | 8.8% |
| Tensile strength$_R$ | DIN 53 455 | 58 MPa |
| Elongation at tear$_R$ | DIN 53 455 | 22% |

EXAMPLE 2

1801 g (5.663 mols) of iso-/terephalic acid diphenylester mixture (1:1), 247.2 g (0.997 mol) of methylphosphonic acid diphenyl ester, 1.4 g ($0.429 \cdot 10^{-2}$ mol) of triphenylphosphate, 1505 g (6.600 mols) of bisphenol A and 0.1 g ($0.862 \cdot 10^{-3}$ mol) of sodium phenolate are reacted in analogous manner to the method described in Example 1. 1.4 kg of a polyester phosphonate are obtained, containing iso-/terephthalate units and phosphonate units in a molar ratio of 85:15.

Analytical data:
$\overline{M}_n = 22100$
$\eta$ rel = 1.302 (measured at 25° C. in a 5% solution in methylene chloride)
Content of Phosphorus 1.3%
$O_2$-Index = 45% (according to ASTM-D 2863-70)
Vicat B = 173° C. (according to DIN 53 460)

EXAMPLE 3

199.6 g (0.6277 mol) of iso-/terephalic acid diphenylester (1:1), 8.24 g ($0.3323 \cdot 10^{-1}$ mol) of methylphosphonic acid diphenyl ester, 0.14 g ($0.4294 \cdot 10^{-3}$ mol) of triphenylphosphate, 150.5 g (0.660 mol) of bisphenol A and 10 mg ($0.862 \cdot 10^{-4}$ mol) of sodium phenolate are reacted in analogous manner to the method described in Example 1. 140 g of an aromatic polyester phosphonate are obtained, containing iso-/terephalate units and phosphonate units in a molar ratio of 95:5.

Analytical data:
$\overline{M}_n = 23600$
$\eta$ rel = 1.311
Content of Phosphorus 0.44%
$O_2$-Index = 39% (according to ASTM-D 2863-70)
Vicat B = 179° C. (according to DIN 53, 460)

EXAMPLE 4

10.5 g ($0.33 \cdot 10^{-1}$ mol) of iso/terephthalic acid diphenyl ester, 156.7 g (0.6319 mol) of methylphosphonic acid diphenyl ester, 0.14 g ($0.4294 \cdot 10^{-3}$ mol) of triphenylphosphate, 150.5 g (0.660 mol) of bisphenol A and 10 mg ($0.862 \cdot 10^{-3}$ mol) of sodium phenolate are reacred in analogous manner to the method described in Example 1. 140 g of an aromatic polyester phosphonate are obtained, containing iso-/terephahalate units and phosphonate units in a molar ratio of 5:95.

Analytical data $M_n = 19700$ $\eta$ rel = 1.298

Content of Phosphorus 10.0%

$O_2$-Index = 67% (according to ASTM-D 2863-70)

Vicat B = 135° C. (according to DIN 53 460)

We claim:

1. A polyester phosphonate of a number average molecular weight of at least 11,000, said phosphonate being a co-condensate containing (A) from 5 to 95 mol % of recurring structural units of the formula

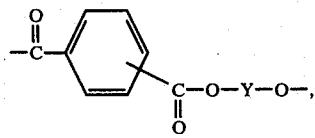

(B) from 95 to 5 mol % of recurring structural units of the formula

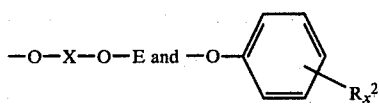

(C) end groups linked to phosphorous selected from the group consisting of:

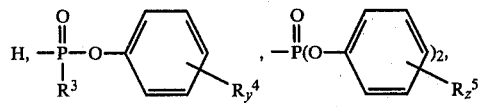

and (D) end groups linked to oxygen selected from the group consisting of

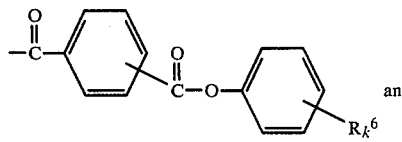

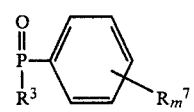

wherein X and Y are each at least one member selected from the group consisting of phenylene, biphenylene, $C_1$-$C_4$ alkylenebisphenylene, $C_5$-$C_{12}$ cycloalkylenebisphenylene, thiobisphenylene, oxybisphenylene, sulphonylbisphenylene, carbonylbisphenylene, naphthylene, each of said phenylene-containing moieties substituted by 1 to 4 moieties selected from the group consisting of $C_1$-$C_4$ alkyl, fluorine, chlorine and bromine and naphthylene substituted by from 1 to 6 moieties selected from the group consisting of $C_1$-$C_4$ alkyl, fluorine, chlorine and bromine; $R^1$ and $R^3$ are each separately selected from the group consisting of $C_1$-$C_{12}$ alkyl, $C_2$-$C_{12}$ alkenyl, $C_6$-$C_{30}$ cycloalkyl, $C_6$-$C_{30}$ cycloalkenyl, $C_6$-$C_{30}$ aryl, $C_6$-$C_{30}$ aralkyl, $C_6$-$C_{30}$ aralkenyl and said aryl-containing moiety substituted by from 1 to 5 moieties selected from the group consisting of $C_1$-$C_4$ alkyl, fluorine, chlorine and bromine; E is selected from the group consisting of —H,

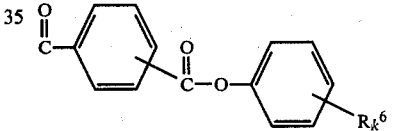

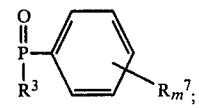

$R^2$, $R^4$, $R^5$ and $R^6$ are each separately selected from the group consisting of $C_1$-$C_4$ alkyl, fluorine, chlorine and bromine and k, m, x, y and z are each separately 0 to 5.

2. A polyester phosphonate according to claim 1 having a number average molecular weight of from 12,000 to 80,000.

3. A polyester phosphonate according to claim 1 wherein $R^1$ and $R^3$ are each separately methyl or phenyl.

4. A polyester phosphonate according to claim 1 having isoterephalate and terephalate units in the ratio of 1:10 to 10:1.

5. A polyester phosphonate according to claim 1 free of halogen as a substituent.

* * * * *